United States Patent [19]
Kang

[11] Patent Number: 6,106,025
[45] Date of Patent: Aug. 22, 2000

[54] OIL NOZZLE LOCK DEVICE

[76] Inventor: Hsin-Fa Kang, 58, Ma Yuan West St., Taichung, Taiwan

[21] Appl. No.: 09/305,273

[22] Filed: May 3, 1999

[51] Int. Cl.[7] .................................................... F16L 11/12
[52] U.S. Cl. ................................................ 285/45; 81/325
[58] Field of Search .............................. 285/325, 80, 387, 285/81, 45

[56] References Cited

U.S. PATENT DOCUMENTS

| | | | |
|---|---|---|---|
| 4,358,140 | 11/1982 | Jonsson | 285/80 |
| 4,614,008 | 9/1986 | Brill et al. | 24/501 |
| 4,826,215 | 5/1989 | Sullivan | 285/373 |
| 4,863,198 | 9/1989 | Petrantro | 285/387 |

*Primary Examiner*—Dave W. Arola

[57] ABSTRACT

An oil nozzle lock device has a hollow male fastener and a hollow female fastener. The hollow male fastener has two lobes, a first inner flange, a first upper semicircular notch, a first lower semicircular notch, a first oblong notch, and an end bevel. The hollow female fastener has two lugs, a spacing defined between the lugs, a second inner flange, a second upper semicircular notch, a second lower semicircular notch, a second oblong notch, and a distal bevel. A torsion spring is disposed between the lobes. The lobes are inserted in the spacing. A pivot shaft fastens the hollow male fastener and the hollow female fastener pivotally.

1 Claim, 4 Drawing Sheets

OIL NOZZLE LOCK DEVICE

BACKGROUND OF THE INVENTION

The present invention relates to an oil nozzle lock device. More particularly, the present invention relates to an oil nozzle lock device which can fasten an end of a connector adjacent to an oil nozzle.

Referring to FIG. 7, a conventional oil nozzle lock has a male fastener 91 and a female fastener 92 engaging with the male fastener 91. The user should detach the male fastener 91 and the female fastener 92 with two hands. Then the conventional oil nozzle lock encloses a connector in order to fasten the connector adjacent to an oil nozzle.

SUMMARY OF THE INVENTION

An object of the present invention is to provide an oil nozzle lock device which can fasten a connector adjacent to an oil nozzle easily with one hand.

Accordingly, an oil nozzle lock device comprises a hollow male fastener and a hollow female fastener engaging with the hollow male fastener. The hollow male fastener has two parallel lobes, a first inner flange, a first upper semicircular notch, a first lower semicircular notch, a first oblong notch, and an end bevel. Each lobe has a round hole. An insertion groove is defined between the lobes. The hollow female fastener has two parallel lugs, a spacing defined between the lugs, a second inner flange, a second upper semicircular notch, a second lower semicircular notch, a second oblong notch, and a distal bevel. Each lug has a circular hole. A torsion spring is inserted in the insertion groove. The lobes are inserted in the spacing. A pivot shaft passes through each circular hole, the torsion spring, and each round hole to fasten the hollow male fastener and the hollow female fastener pivotally.

DETAILED DESCRIPTION OF THE INVENTION

Figure 1:
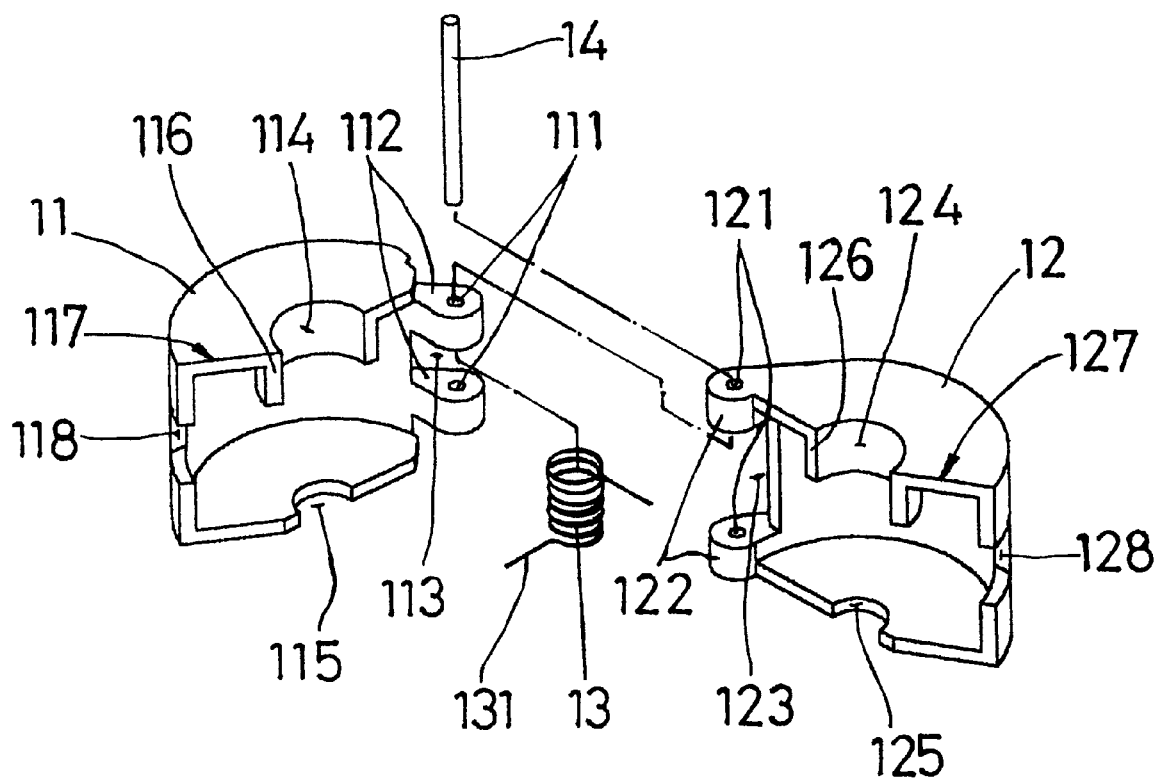
FIG. 1 is a perspective exploded view of an oil nozzle lock device of a preferred embodiment in accordance with the present invention.
Figure 2:
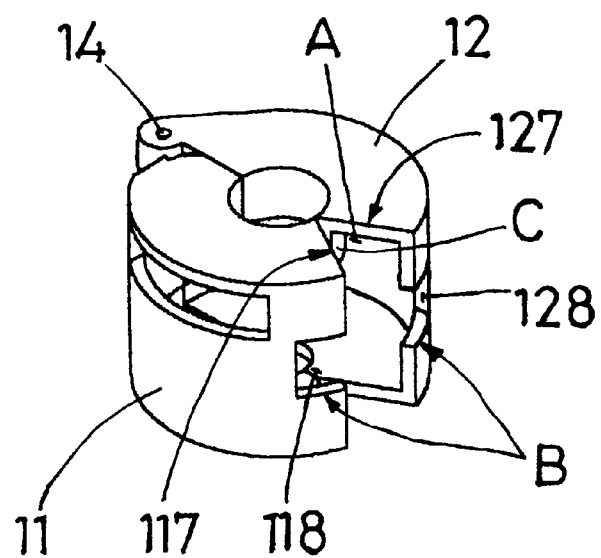
FIG. 2 is a perspective assembly view of an oil nozzle lock device of a preferred embodiment in accordance with the present invention.
Figure 5:
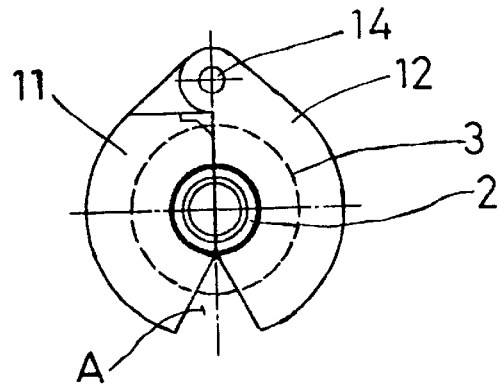
FIG. 5 is a schematic view illustrating an oil nozzle lock device of a preferred embodiment encloses a connector.
Figure 4:
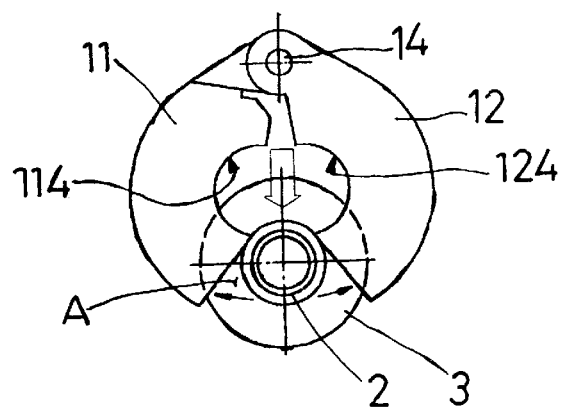
FIG. 4 is a schematic view illustrating an oil nozzle lock device of a preferred embodiment engages with a connector.
Figure 3:
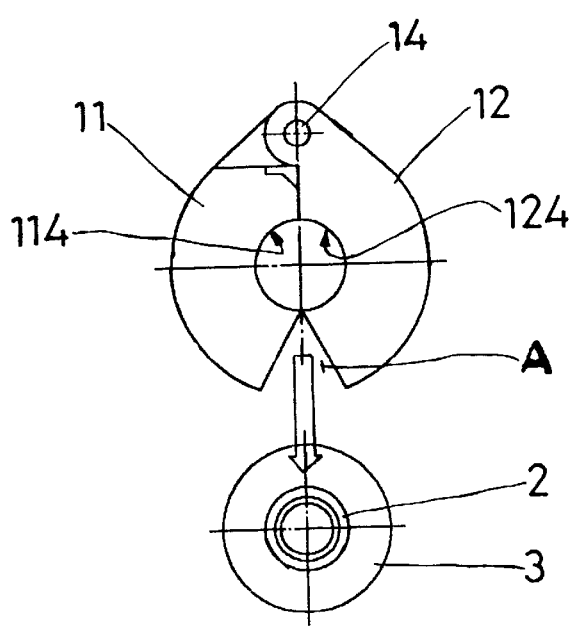
FIG. 3 is a schematic view illustrating an oil nozzle lock device of a preferred embodiment approaches a connector.
Figure 6:
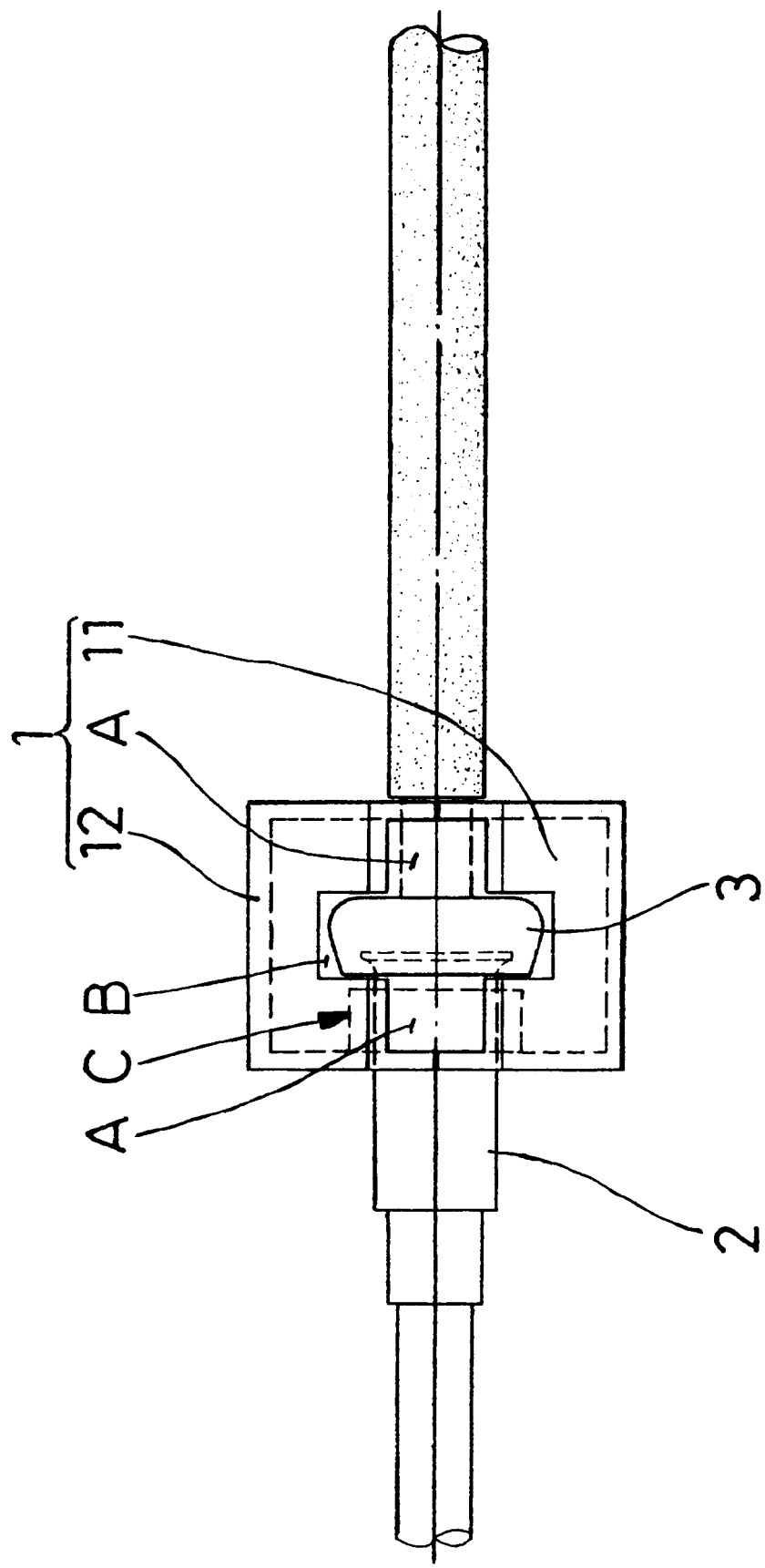
FIG. 6 is an elevational view of an oil nozzle lock device of a preferred embodiment enclosing a connector.
Figure 7:
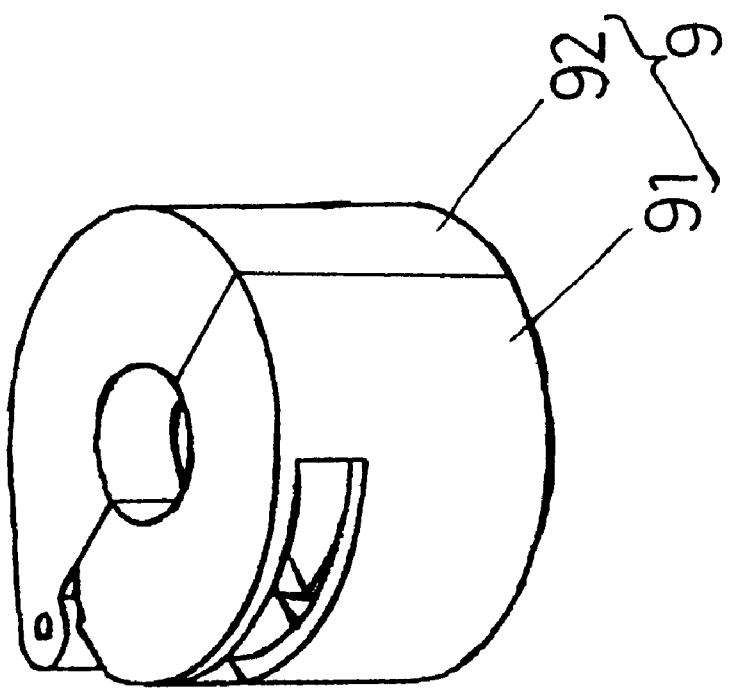
FIG. 7 is a perspective view of a conventional oil nozzle lock of the prior art.

Referring to FIGS. 1 to 6, an oil nozzle lock device 1 comprises a hollow male fastener 11 and a hollow female fastener 12 engaging with the hollow male fastener 11.

The hollow male fastener 11 has two parallel lobes 112, a first inner flange 116, a first upper semicircular notch 114, a first lower semicircular notch 115, a first oblong notch 118, and an end bevel 117. Each of the lobes 112 has a round hole 111.

An insertion groove 113 is defined between the lobes 112.

The hollow female fastener 12 has two parallel lugs 122, a spacing 123 defined between the lugs 122, a second inner flange 126, a second upper semicircular notch 124, a second lower semicircular notch 125, a second oblong notch 128, and a distal bevel 127. Each of the lugs 122 has a circular hole 121.

A torsion spring 13 is inserted in the insertion groove 113. The torsion spring 13 has two distal rods 131. The lobes 112 are inserted in the spacing 123.

A pivot shaft 14 passes through each circular hole 121, the torsion spring 13, and each round hole 111 to fasten the hollow male fastener 11 and the hollow female fastener 12 pivotally.

A V-shaped notch A is defined between the end bevel 117 and the distal bevel 127. An inner ring C is formed by the first inner flange 116 and the second inner flange 126. An enlarged notch B is formed by the first oblong notch 118 and the second oblong notch 128.

Referring to FIG. 3 again, the oil nozzle lock device 1 approaches a connector 3.

Referring to FIG. 4 again, the connector 3 enters the oil nozzle lock device 1 via the V-shaped notch A to force the oil nozzle lock device 1 to open.

Referring to FIGS. 5 and 6 again, the oil nozzle lock device 1 encloses the connector 3.

The present invention has the following advantages. The user can use one hand to operate the oil nozzle lock device 1. Therefore, the oil nozzle lock device 1 can enclose the connector 3 quickly and easily. Furthermore, the V-shaped notch A facilitates the connector 3 to enter the oil nozzle lock device 1. The user can open the oil nozzle lock device 1 again via the V-shaped notch A and the enlarged notch B.

The present invention is not limited to the above embodiment but various modification thereof may be made. Furthermore, various changes in form and detail may be made without departing from the scope of the present invention.

I claim:

1. An oil nozzle lock device comprises:
   a hollow male fastener and a hollow female fastener engaging with the hollow male fastener,
   the hollow male fastener having two parallel lobes, a first inner flange, a first upper semicircular notch, a first lower semicircular notch, a first oblong notch, and an end bevel,
   each said lobe having a round hole,
   an insertion groove defined between the lobes,
   the hollow female fastener having two parallel lugs, a spacing defined between the lugs, a second inner flange, a second upper semicircular notch, a second lower semicircular notch, a second oblong notch, and a distal bevel,
   each said lug having a circular hole,
   a torsion spring inserted in the insertion groove,
   the lobes inserted in the spacing,
   a pivot shaft passing through each circular hole, the torsion spring, and each round hole to fasten the hollow male fastener and the hollow female fastener pivotally,
   a V-shaped notch defined between the end bevel and the distal bevel, and
   an enlarged notch formed by the first oblong notch and the second oblong notch.

* * * * *